United States Patent
Jacobson

[11] Patent Number: 5,727,098
[45] Date of Patent: Mar. 10, 1998

[54] OSCILLATING FIBER OPTIC DISPLAY AND IMAGER

[76] Inventor: Joseph M. Jacobson, 1060 Fremont St., Menlo Park, Calif. 94025

[21] Appl. No.: 369,695

[22] Filed: Jan. 6, 1995

Related U.S. Application Data

[63] Continuation-in-part of Ser. No. 301,384, Sep. 7, 1994, abandoned.

[51] Int. Cl.[6] .................................................. G02B 6/26
[52] U.S. Cl. ............................ 385/31; 385/22; 385/38; 385/47
[58] Field of Search ............................. 385/31, 16, 38, 385/22, 47, 33, 115, 147; 340/407.1; 345/31, 7

[56] References Cited

U.S. PATENT DOCUMENTS

| | | | |
|---|---|---|---|
| 3,112,360 | 11/1963 | Gregg | 178/5.4 |
| 3,437,393 | 4/1969 | Baker et al. | 350/6 |
| 3,470,320 | 9/1969 | Pike et al. | 178/7.6 |
| 3,530,258 | 9/1970 | Gregg et al. | 179/100.3 |
| 3,621,133 | 11/1971 | Baker et al. | 178/7.3 |
| 3,760,181 | 9/1973 | Daly et al. | 250/83.3 |
| 3,836,225 | 9/1974 | Wilde et al. | 350/6 |
| 3,941,927 | 3/1976 | Russell | 178/7.6 |
| 3,958,235 | 5/1976 | Duffy | 340/336 |
| 4,097,115 | 6/1978 | Garwin et al. | 350/6.7 |
| 4,225,862 | 9/1980 | Johnson | 340/755 |
| 4,236,784 | 12/1980 | Palmer | 350/96.2 |
| 4,311,999 | 1/1982 | Upton et al. | 340/755 |
| 4,340,888 | 7/1982 | Seroskie | 340/749 |
| 4,410,235 | 10/1983 | Klement et al. | 350/96.18 |
| 4,477,727 | 10/1984 | Rud | 250/237 |
| 4,543,663 | 9/1985 | Laor | 455/600 |
| 4,595,990 | 6/1986 | Garwin et al. | 364/518 |
| 4,651,343 | 3/1987 | Laor | 455/600 |
| 4,654,716 | 3/1987 | Zimmerman | 358/237 |
| 4,831,370 | 5/1989 | Smoot | 340/755 |
| 4,897,715 | 1/1990 | Beamon, III | 358/93 |
| 4,934,773 | 6/1990 | Becker | 350/6.6 |
| 5,009,473 | 4/1991 | Hunter et al. | 350/6.6 |
| 5,138,159 | 8/1992 | Takase et al. | 250/306 |
| 5,220,361 | 6/1993 | Lehmer et al. | 351/226 |
| 5,224,198 | 6/1993 | Jachimowicz et al. | 351/210 |
| 5,270,748 | 12/1993 | Katz | 351/210 |
| 5,281,960 | 1/1994 | Dwyer, III | 345/31 |

FOREIGN PATENT DOCUMENTS

| | | | |
|---|---|---|---|
| 2 139 819 | 11/1984 | United Kingdom | 455/600 |

OTHER PUBLICATIONS

P. Chang et al., High Speed Impact Actuator Using Multilayer Piezoelectric Ceramics, Sensors and Actuators A, 24, p. 239–244, 1990.

J. Soderkvist et al., The piezoelectric effect of GaAs used for resonators and resonant sensors, J. Micromechanical Microengineering, 4, pp. 28–34, 1994.

R.C. Fisher et al., "Vibrating Display Unit", IBM Technical Discloure Bulletin, vol. 22, No. 1, Jun. 1979, pp. 6–8.

O.D. Johnson, "Vibrating Light–Emitting Diode Display Apparatus", IBM Technical Disclosure Bulletin, vol. 22, No. 1, Jun. 1979, pp. 4–5.

G.A. Meyers, "Eye Monitor, Microcomputer–Based Instrument Uses an Internal Model to Track the Eye," Proceedings of the Annual Conference in Medicine and Biology (IEEE), vol. 14, Pt. 4, pp. 1694–1695, 1991.

J. Wilson et al., "Optoelectronics, An Introduction", Prentice Hall International, 1983, pp. 409–410 No Month.

R.W. Massof et al., "Low–Vision Enhancement System", SID 94 Digest, pp. 25–27 No Month.

*Primary Examiner*—Phan T. H. Palmer
*Attorney, Agent, or Firm*—Morgan & Finnegan L.L.P.

[57] ABSTRACT

A display system includes an image light source for producing a modulated light, an optical fiber having a first end and a second end, the first end of the optical fiber being coupled to the light source, and a deflation device coupled to the second end of the optical fiber, the deflection device deflecting the second end of the optical fiber in a two-dimensional scan pattern for projecting an image onto a viewing surface from the second end of the optical fiber, wherein the projected image is related to the modulated light.

56 Claims, 10 Drawing Sheets

OSCILLATING FIBER OPTIC DISPLAY AND IMAGER

This application is a continuation-in-part of U.S. patent application Ser. No. 08/301,384 filed Sep. 7, 1994 now abandoment.

BACKGROUND OF THE INVENTION

1. Field of the Invention

The present invention relates to an image projection system. More particularly, the present invention relates to a compact fiber optic display system having a single optical fiber which is vibrated in a predetermined scan pattern for producing a projected two-dimensional displayed image.

2. Description of the Related Art

There are many presently known compact display systems for producing a projected image display. For example, several relatively compact heads up displays (HUDs) and projection systems use cathode ray tube (CRT) technology as a light source for the projected image. However, the power requirements associated with CRTs and the brightness level requirements for particular applications cause CRT technology to be a less than ideal approach for compact image projection systems.

Various image projection systems have been disclosed which improve upon CRT technology. For example, U.S. Pat. No. 4,654,716 to Zimmerman discloses an electron beam scanned semiconductor laser. This particular approach, however, is unduly complex and suffers from a short operating lifetime.

U.S. Pat. No. 5,224,198 to Jachimowicz et at. discloses an image conduit coupled to a two-dimensional array of light emitting diodes (LEDs). This particular approach has the disadvantages of a high level of complexity and requiring precision during fabrication while providing a system having insufficient brightness for image projection applications. Further, a color image display is difficult to produce using this approach.

Scanning optical display systems have also been known for some time. For example, U.S. Pat. No. 3,437,393 to Baker et al. discloses a display system for projecting a beam of light from a laser source using rotating mirrors for forming a predetermined two-dimensional scan pattern. U.S. Pat. No. 3,958,235 to Duffy discloses a display system having a plurality of LEDs disposed on a cantilever member for forming an image display. The cantilever member is vibrated in an arc at a predetermined rate while selected LEDs are energized for producing the display.

Other known approaches are based on optical light sources coupled to fiber optics. For example, U.S. Pat. No. 4,311,999 to Upton et al. discloses a display system having a plurality of light emitting sources coupled to a linear array of optical fibers. The array of optical fibers is vibrated in a direction which is perpendicular to the axis of the linear fiber array for producing a two-dimensional display. Variations of this approach are described in U.S. Pat. No. 3,836,225 to Wilde et at., for example, which discloses a laser beam scanning system for use in an air and an underwater tracking system. In this system, a light beam from a single light source is coupled to a first coherent bundle of optical fibers. The first coherent bundle of fibers is deflected along a first dimension for scanning the light beam into a second coherent bundle of fibers. The second bundle is then deflected along a second dimension which is orthogonal to the first dimension for producing a two-dimensional scan pattern.

These known display systems have the disadvantage of either requiring a plurality of light sources individually modulated for each horizontal pixel or being unduly complex.

U.S. Pat. No. 4,651,343 to Laor, which is incorporated by reference herein, discloses a system which includes two piezoelectric bender elements for positioning an end of an optical fiber. The first bender element is a generally elongated member having a first end fastened to a base and a second, free end which is controlled with electrical signals for deflecting along a first axis. The first end of the second bender element is fastened to the free end of the first bender element. The second, free end of the second bender element is controlled with electrical signals for deflecting along a second axis which is perpendicular to the first axis. An end of an optical fiber is mounted to the free end of the second bender element. While the Laor system is primarily directed to a switch apparatus for positioning an end of the optical fiber with respect to other optical fiber ends, the disclosed system can be used to produce a two-dimensional slow scan display, such as an electrocardiograph. Nevertheless, the Laor system cannot provide a real-time image display because the second bender element must put into motion not only its mass along the second axis, but also the mass of the first bender element along the second axis. Consequently, the maximum drive frequency is severely curtailed and the system is too slow for real-time displays or imaging.

Other patents disclose techniques for using a single optical fiber which is scanned in two-dimensions for capturing an image. For example, U.S. Pat. No. 3,470,320 to Pike et al. and U.S. Pat. No. 3,112,360 to Gregg disclose force field scanning system having a glass fiber which is held in a modulated field for scanning an image or document in two dimensions. Other patents disclose systems which are either not suitable for real-time display purposes because they use a non-continuous scanning motion, such as that disclosed in U.S. Pat. No. 4,236,784 to Palmer, or relate to a deflection system for primarily causing motion in one dimension, such as in U.S. Pat. No. 3,941,927 to Russell, or do not relate to a display application such as the patent to Russell.

Thus, the presently-known display systems do not provide a system which is compact, efficient, inexpensive and produces a precise real-time image display.

SUMMARY OF THE INVENTION

The disadvantages of previously known image display systems are overcome by the present invention which provides a display system including a light source for producing a modulated light, an optical fiber having a first end and a second end with the first end of the optical fiber being coupled to the light source, and a deflection device coupled to the second end of the optical fiber, wherein the deflection device deflects the second end of the optical fiber in a predetermined two-dimensional scanning pattern for projecting an image onto a viewing surface from the second end of the optical fiber, and wherein the projected image is related to the modulated light. The light source can be either a single light source for projecting a monochrome image or a plurality of chromatic light sources for projecting a full color image. Preferably, the light source, whether a single source or a plurality of sources, can be a light emitting diode, a laser diode or a conductive plastic light emitting element. A Faraday-type or a waveplate polarizer isolator can be disposed between the light source and the first end of the optical fiber to avoid unintentional feedback to the light source.

The display system according to the invention also includes an imaging optical device disposed at or attached to the second end of the optical fiber for adjusting the projected image so that the projected image can be viewed on the viewing surface or for reducing an intensity of the modulated light at an output face of the second end of the optical fiber. Preferably, the imaging optical device can be a dispersive optical device, a reflective optical device, a Fresnel optical device, a graded refractive index optical device or a binary optic type optical device.

One configuration of the deflection device according to the invention includes a magnetic material formed on the second end of the optical fiber, and a plurality of electromagnets arranged at the second end of the optical fiber for producing a variable magnetic field which couples the magnetic material such that the variable magnetic field of the electromagnets interacts with the magnetic material for deflecting the second end of the optical fiber in the predetermined scanning pattern. Additionally, a feedback device is included for detecting a position of the second end of the optical fiber and providing an indication to the deflection device of the detected position of the second end of the optical fiber such that the deflection device is responsive to the indication for synchronizing the modulated light with the predetermined scan pattern. Preferably, the feedback device can be a hall effect detector, a proximity sensor, a strain gauge which may be actuating a piezoelectric transducer element, or a magnetic impedance detector coupled to the plurality of electromagnets for detecting an impedance of the electromagnets.

The feedback device according to the invention can also be a second light source coupled to the first end of the optical fiber with the second light source emitting a second light which is projected from the second end of the optical fiber, a reflective array disposed at the second end of the optical fiber for reflecting the second light projected from the second end of the optical fiber back to the second end of the optical fiber, and a detector, coupled to the first end of the optical fiber and to the deflection device, for detecting the second light which is reflected by the reflective array and received by the second end of the optical fiber and for producing the indication of the detected position of the second end of the optical fiber.

Another configuration of the deflection device includes a first electromagnet coupled to the second end of the optical fiber for generating a first magnetic field, and second and third electromagnets arranged at the second end of the optical fiber for producing second and third variable magnetic fields, respectively, with the second and third variable magnetic fields coupling the first magnetic field, wherein the second and third variable magnetic fields interact with the first magnetic field for deflecting the second end of the optical fiber in the predetermined scanning pattern.

A third configuration of the deflection device includes a plurality of piezoelectric transducer elements formed on or attached to the second end of the optical fiber, wherein the piezoelectric transducer elements are responsive to deflection drive signals for deflecting the second end of the optical fiber in the predetermined scanning pattern. Yet another configuration of the deflection device includes a first electrostatic device coupled to the second end of the optical fiber and a second electrostatic device arranged at the second end of the optical fiber, wherein the first and second electrostatic devices interact for deflecting the second end of the optical fiber in the predetermined scanning pattern.

Depending upon the particular configuration of the present invention, the deflection device can include a piezoelectric material having high intrinsic Q such that the piezoelectric material is responsive to deflection drive signals for deflecting the second end of the optical fiber in the two-dimensional scanning pattern. In another configuration, the second end of the optical fiber is resonantly driven by the deflection device such that the deflection device is not in continuous contact with the second end of the optical fiber so that a Q of the deflection device is decoupled from a Q of the second end of the optical fiber. Such a configuration can include an impact actuator having a hammer element for deflecting the second end of the optical fiber so that a resonant structure of the second end of the optical fiber is not in continuous contact with the hammer element of the impact actuator. Of course, the second end of the optical fiber can be driven resonantly by the deflection device which is in continuous contact with the second end of the optical fiber. Such a configuration can include an impact actuator having a hammer element for deflecting the second end of the optical fiber, and a resonant structure of the second end of the optical fiber is in continuous contact with the hammer element of the impact actuator.

According to the invention, the deflection device can also be a parametric driver which includes at least one magnetic coil driven by a doubly-modulated waveform. The parametric driver can also include two electromagnetic coils which are arranged either serially or concentrically.

The display system according to the invention also includes a controller, coupled to the deflection device and the light source, for synchronizing the modulated light with the deflection of the second end of the optical fiber. According to one configuration of the controller, the modulation of the light source is based on a non-linear algorithm for synchronizing the modulation of the source with a position of the second end of the optical fiber.

A detector, which is preferably a photodiode, a high sensitivity detector, an avalanche photodiode or a photomultiplier tube, can be coupled to the first end of the optical fiber for detecting light which is received by the second end of the optical fiber. The light detected by the detector can be coupled to the light source for projecting an image from the second end of the optical fiber which is related to the detected light. The detector can be either a single detector for detecting monochromatic light or a plurality of detectors for detecting chromatic light.

A mechanically resonant device having a non-isotropic cross section can be fitted on the second end of the optical fiber so that the mechanically resonant device and the optical fiber together have a first resonant frequency along a first dimension of the two-dimensional scanning pattern and a second, different resonant frequency along a second dimension of the two-dimensional scanning pattern.

According to an aspect of the invention, a second light source is coupled to the first end of the optical fiber for producing a second light which is projected from the second end of the optical fiber for illuminating a user's eye such that the detector detects the second light illuminating the user's eye for determining the direction of the user's gaze.

According to another aspect of the invention, a light stylus can be used for projecting a pointer light onto the viewing surface such that wherein the detector coupled to the optical fiber detects the pointing light received through the second end of the optical fiber. The pointer light can be modulated and the detector accordingly configured so that the detector detects the modulated pointer light received through the second end of the optical fiber. An electronic notch or an electronic frequency domain filter coupled to an output of the detector discriminates the detected modulated pointer light.

The optical fiber of the invention can alternatively be a plurality of optical fibers which are formed into a bundle of optical fibers having a corresponding first end and a second end. As in the previous case of a single fiber, the second end constitutes a single pixel. In this case, the system light source is a plurality of light sources with each light source coupled to a respective optical fiber of the plurality of optical fibers at the first end of the bundle of optical fibers. The deflection device of this configuration is coupled to the second end of the bundle of optical fibers so that the second end of the bundle of optical fibers is deflected in the predetermined scanning pattern for projecting the image onto the viewing surface from the second end of the bundle of optical fibers.

The system according to the invention can be embodied as a frame on which the optical fiber and the viewing surface are mounted with the frame being adapted to be worn by a user. In other embodiments, the viewing surface of the present invention is associated with a device such as a computer or a pager.

Other advantages and features will become apparent from the following description and from the claims.

BRIEF DESCRIPTION OF THE DRAWINGS

The various objects and features of the present invention, together with other advantages and benefits which may be attained by its use, will become more apparent in view of the following detailed description of the invention taken in conjunction with the drawings. In the drawings, wherein like reference numerals identify corresponding portions of the various embodiments of the display system according to the present invention.

DETAILED DESCRIPTION OF THE PREFERRED EMBODIMENTS

The present invention is a compact fiber optic display system having a modulated light source coupled to a proximal end of an optical fiber while the distal end of the fiber is vibrated in a predetermined scan pattern for projecting a two-dimensional image onto a viewing surface. The present invention includes a feedback system for synchronizing modulation of the light source with the predetermined scan pattern of the distal end of the optical fiber. According to the invention, a single monochromatic light source is used for generating a monochromatic image or a plurality of separately modulated chromatic light sources are used for generating a color image. Information, such as an eye position or a gaze determination of a user, may simultaneously be gathered as an image is projected by coupling an appropriate sensor to the proximal end of the optical fiber. Other information, such the position of a light spot emitted from a light emitting stylus, may be gathered for producing an interactive display system.

Figure 1:
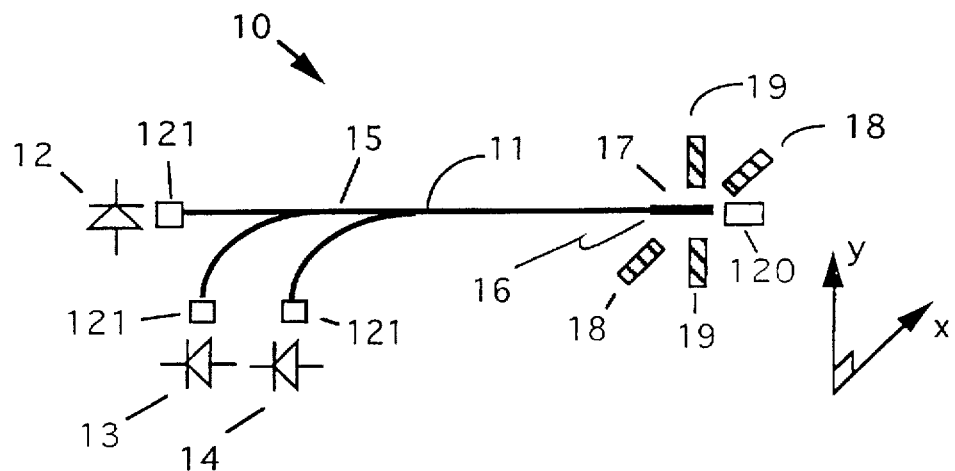
FIG. 1 is a partially perspective and partially schematic view of a full color fiber optic display system according to the present invention.
Figure 7:
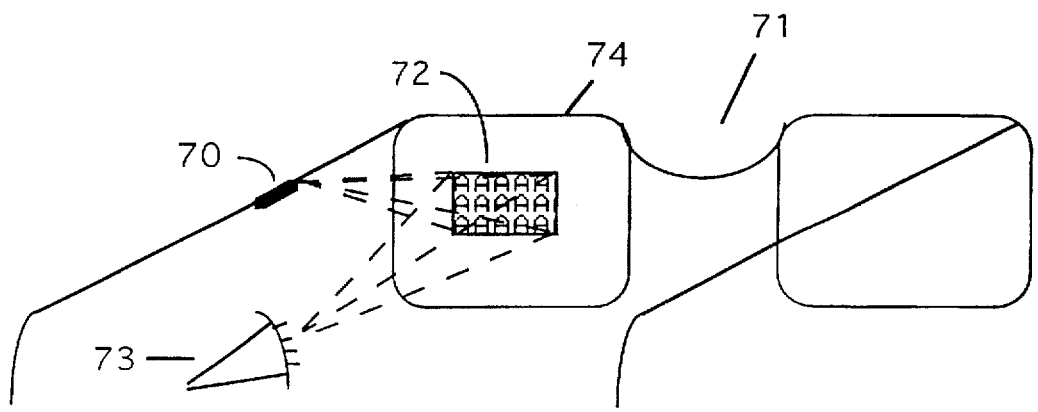
FIG. 7 is a partially perspective and partially schematic view of a fiber optic display system according to the present invention configured as a pair of spectacles for a heads up display.
Figure 9:
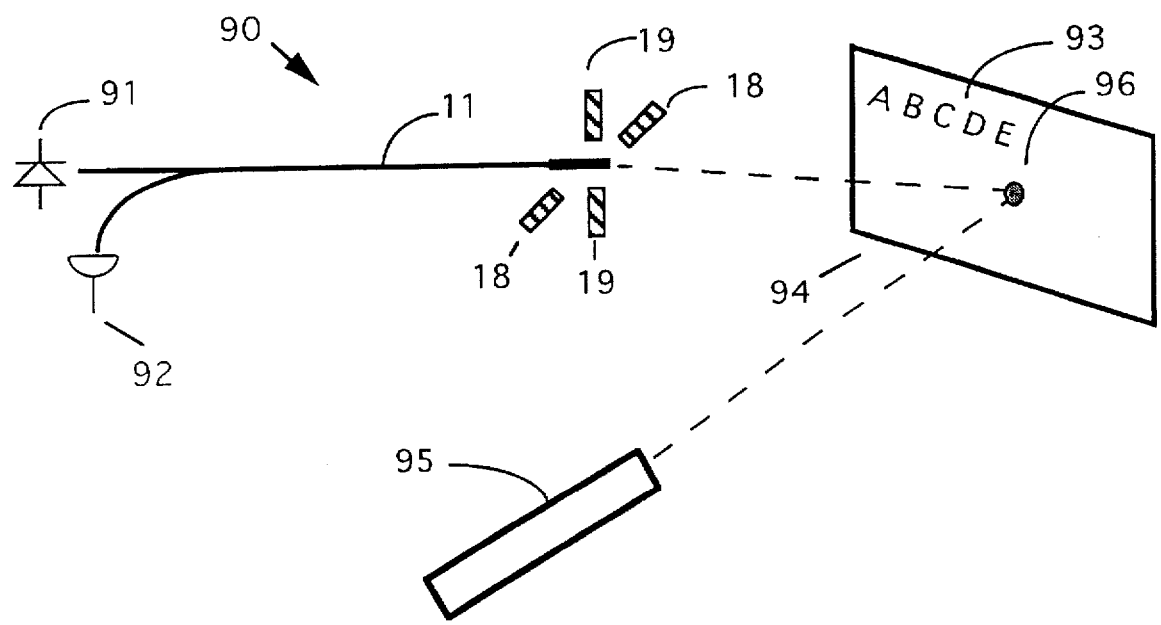
FIG. 9 is a partially perspective and partially schematic view of a fiber optic display system according to the present invention configured as an interactive display system which is responsive to a light spot projected by a light emitting stylus.
Figure 10:
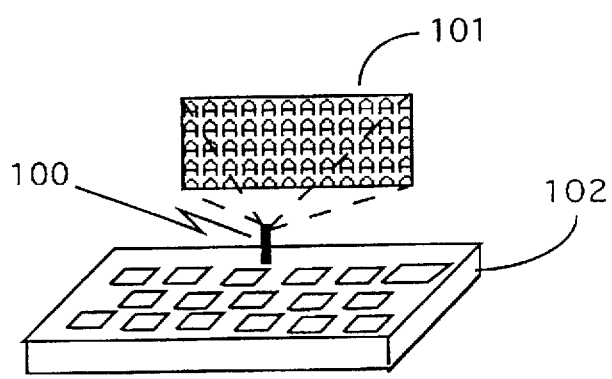
FIG. 10 is a partially perspective and partially schematic view of a fiber optic display system according to the present invention configured as a display for a computer.

FIG. 1 shows a partially perspective and partially schematic view of a full color fiber optic display system 10 according to the present invention. Light sources 12–14 are coupled to a proximal end 15 of a single optical fiber 11 using well-known techniques. Optical fiber 11 can be either a single mode or a multimode fiber. Distal end 17 of fiber 11 is vibrated in a predetermined two-dimensional scan pattern for projecting light from sources 12–14 onto a viewing surface (FIGS. 7, 9 and 10). Each respective light source 12–14 is selected to produce one of the primary colors required for generating a color image. Preferably, light sources 12–14 are LEDs, laser diodes or conductive plastic light emitting elements which are modulated using well-known modulation techniques for generating an image which is projected with high contrast. Exact color convergence of the projected image is guaranteed because the individual color light sources 12–14 are each coupled to a single optical fiber 11.

Depending upon the particular application, an appropriate imaging optic device 120, for example, a dispersive, a reflective, a Fresnel, a graded refractive index or a binary optic type optic device, may be used at, or attached to, distal end 17 for providing proper magnification of the projected image and/or to reduce the intensity of the projected image (power per unit area) at the exit face of optical fiber 11. An isolator 121, such as a Faraday-type or a wave plate polarizer, can be disposed between the light sources and the optical fiber for preventing inadvertent feedback to the light sources.

While three chromatic light sources are shown in FIG. 1 for generating a color image, a single monochromatic light source, for example, only light source 12, may be used for generating a monochrome image. Alternatively, additional light sources of the same color may be added for redundancy. In the various embodiments and configurations which follow, a single modulated monochromatic light source is interchangeable with a plurality of modulated chromatic light sources depending on the requirements of a particular application.

In one configuration of the present invention, distal end 17 of fiber 11 is coated with a suitably poled magnetic material or metal 16 such that under proper drive conditions x-axis actuator 18 and y-axis actuator 19 produce variable magnetic fields which couple magnetic material 16 and causes the distal end 17 of fiber 11 to vibrate along the x- and y-axes with frequencies $f_x$ and $f_y$, respectively. In this configuration, actuators 18 and 19 are electromagnets which are driven with suitable drive signals for deflecting distal end 17 through a predetermined two-dimensional scan pattern. A suitable magnetic coating for magnetic material 16 is disclosed in U.S. Pat. No. 4,236,784 to Palmer, which is incorporated by reference herein.

Figure 2A:
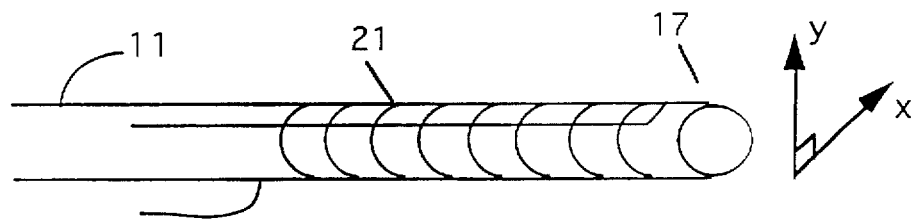
FIGS. 2A and 2B are views of the distal end of a scanned optical fiber according to the present invention showing different techniques for deflecting the distal end.

FIG. 2A shows a printed wire coil 21 or a wound wire coil for generating a magnetic field which is oriented along the longitudinal axis of optical fiber 11 which can be used in place of magnetic material 16. Since a magnetic field generated in this manner becomes non-axial at distal end 17 due to end effects, such a field may interact with the magnetic field of electromagnets 18 and 19.

Figure 2B:
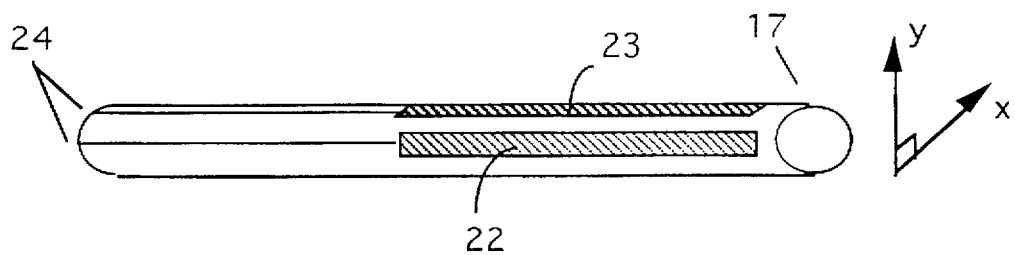

Other techniques which may also he used in place of magnetic material 16 and electromagnets for actuators 18 and 19 for rapidly deflecting distal end 17 include piezoelectric, magnetostrictive, and electrostatic field deflection techniques. FIG. 2B shows a view of distal end 17 in which transducer elements 22 and 23, are formed on fiber 11 using known techniques along the horizontal and vertical axes of the system. Transducer elements corresponding to elements 22 and 23, which are not shown because of the perspective nature of FIG. 2B, are also formed along the horizontal and vertical axes of the system corresponding to element 22 for deflecting distal end 17 along the horizontal axis. Element 22 and its corresponding element deflect distal end 17 along the horizontal axis, while element 23 and its corresponding element deflect distal end 17 along the vertical axis. Wires 24 are coupled to the transducer elements in a known manner for applying control signals to the elements so that distal end 17 is deflected in a predetermined scan pattern. When a piezoelectric deflection technique is used, the elements 22 and 23 and their corresponding elements are piezoelectric transducer elements formed, for example, from a PVDF material in either bimorph or multimorph configuration, and actuators 18 and 19 are not required. Similarly, when an electrostatic field deflection technique is used, elements 22 and 23 and their corresponding elements are electrostatic transducer elements, and, accordingly, actuators 18 and 19 are electrostatic field actuators.

Figure 2C:
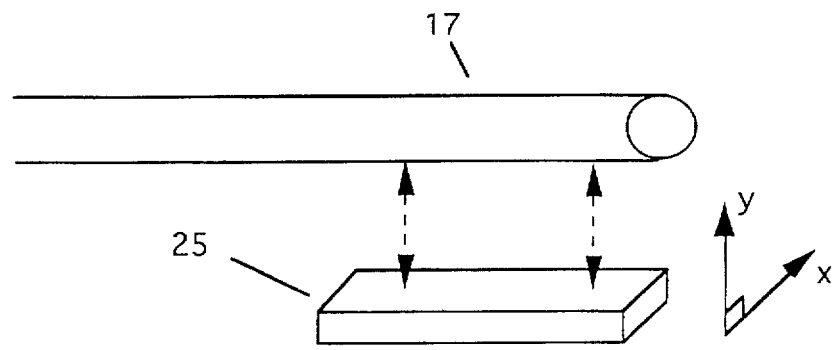
FIG. 2C is an exploded view of a mechanically resonant structure mounted to an optical fiber according to the present invention.

FIG. 2C shows a cross section of a mechanically resonant device 25 having a non-isotropic cross section and which can be fired on the distal end of the optical fiber for imbuing the fiber with a different resonant frequency along each of the x- and y-axes. The structure of resonant device 25 acts to store the motional energy of the fiber for producing an oscillating device having a characteristically low energy consumption.

Figure 3:
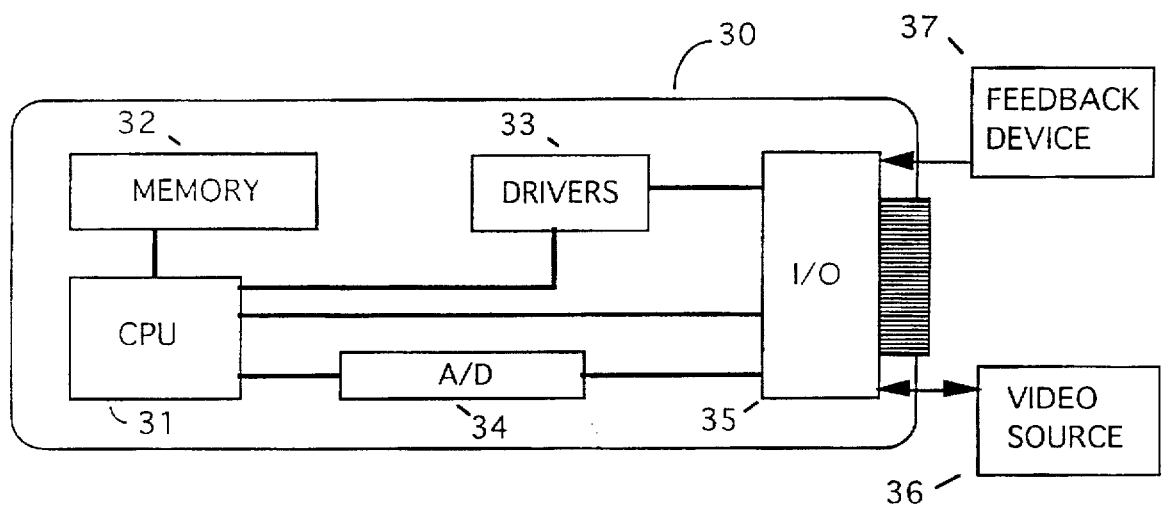
FIG. 3 is a schematic block diagram of an electronic control circuit for controlling a fiber optic display system according to the present invention.

FIG. 3 shows a general configuration of a controller 30 for controlling the present invention. Controller 30 includes a central processor unit (CPU) 31, memory 32, driver 33, analog-to-digital (A/D) converter 34 and input/output (I/O) circuit 35. CPU 31 provides overall control of controller 30 in a well-known manner. Memory 32, which is coupled to CPU 31, stores images for display. Such stored images may have been acquired by, for example, scanning an image or may be generated based on an algorithm stored in memory 32 and which is executed by CPU 31. Memory 32 can also store algorithms for display driver feedback and/or linearization of the fiber motion based on a non-linear algorithm for synchronizing the modulation of light source 12 with the position of distal end 17, or eyetracking and other such algorithms. Memory 32 can be, for example, a memory bank of random access memory (RAM) of sufficient size, read only memory (ROM), a mass storage device, such as a magnetic disk memory or CD ROM, or any suitable combination of these or similar memory devices. Drivers 33 modulate light emitting sources 12–14 (FIG. 1) for generating an image for display, for generating a light field used detecting the position of the distal end 17 of optical fiber 11, for illuminating an object which is scanned for image capture or acquisition, and/or for driving other light sources. A/D converter 34 digitizes analog outputs of detectors of I/O circuit 35 for image capture, fiber distal end position feedback schemes, eye-tracking techniques and/or for other suitable purposes, such as controlling the output intensity of source 12 based on detected ambient light or projected light reflected from the viewing surface. For distal end feedback purposes, A/D converter 34 can alternatively receive an output from a feedback device, such as a bend detector which detects bending of fiber 11 based on an output of a strain gauge, a proximity sensor, a light leakage detector for detecting light leakage from fiber 11 when the fiber is bent, an output from a hall-effect sensor, or a magnetic impedance detector coupled to electromagnets 18 and 19 of a magnetic drive circuit. The position of distal end 17 can be synchronized with the modulation of the light sources based on the output of the feedback device.

Depending on overall system requirements, I/O circuit 35 can be configured to handle both serial and parallel digital data exchange and/or analog data exchange between controller 30 and fiber optic display system 10, and/or another computer or other device. Controller 30 can also receive image source information from video source 36 which is located external to system 30, such as a video broadcast signal, a video recorder device or from another computer.

Controller 30 may be embodied using standardly available components which provide the specific system performance parameters for a particular application. The various components of controller 30 may be dedicated components configured as required or may be an application specific integrated circuit (ASIC) having the constituent components of the controller. Additionally, controller 30 may include other components not specifically set forth, but which are required for a particular application or system configuration.

Figure 4:
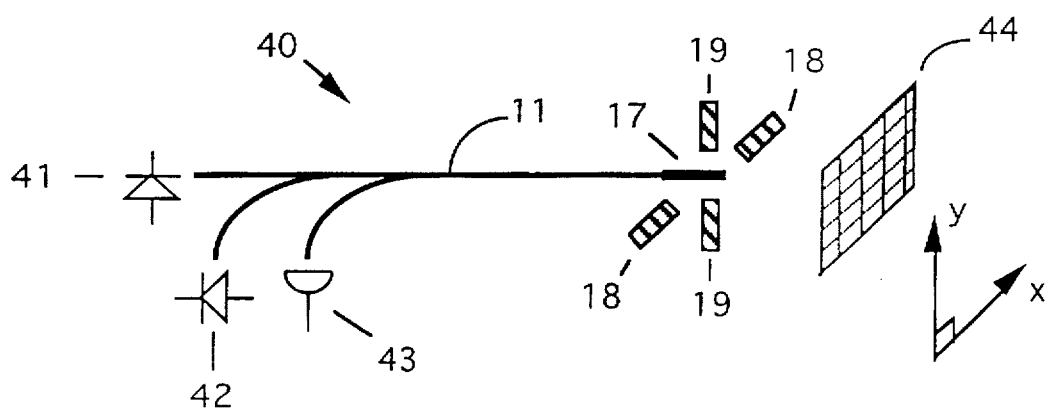
FIG. 4 is a partially perspective and partially schematic view showing a tip position feedback scheme according to the present invention.

FIG. 4 shows another embodiment of a fiber optic display system 40 according to the invention. Display system 40 is similar to display system 10 of FIG. 1, but is shown with single light source 41 representing light sources 12–14 of FIG. 1 for simplicity. Display system 40 also includes an optical emitter 42 and a corresponding detector 43. Both emitter 42 and detector 43 are coupled to optical fiber 11. Optical emitter 42 emits a band of light which is not visible, such as infrared (IR) or ultraviolet (UV), and detector 43 detects the particular band of light emitted by emitter 42. A grid-like array reflector 44 is positioned at the distal end of scanned fiber 11. Reflector array 44 reflects only the non-visible radiation of the emitter 42 and is substantially transparent to the other bands of visible radiation emitted by source 41. Reflector array 44 is fabricated using well-known dielectric mirror fabrication techniques and is etched using well-known lithographic techniques. The number of vertical and horizontal lines in reflector array 44 is chosen to be equal to the desired horizontal and vertical resolution of system 40 or can be chosen to be less, depending on the particular feedback algorithm employed.

When fiber 11 of system 40 is scanned in the x- and y-directions, non-visible light emitted from emitter 42 strikes reflector array 44. If fiber 11 is positioned so that it is aligned with a grid line of reflector array 44, the non-visible light is reflected back to the distal end 17 of fiber 11. Detector 43, which is sensitive only to the particular band of radiation emitted by emitter 42, detects the reflected radiation and registers an impulse which is conveyed, for example, to controller 30 for synchronizing modulation of the image generating light source 41 with the position of distal end 17. Additionally, the detected radiation can be used for proper image registration, that is, feedback for controlling actuators 18 and 19 for accurately positioning distal end 17 with respect to a viewing surface.

Figure 5A:
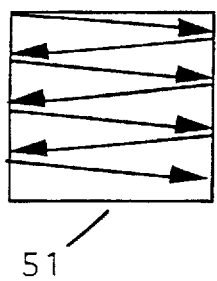
FIGS. 5A and 5B are illustrations of exemplary scanning patterns for the optical fiber system according to the present invention.
Figure 5B:
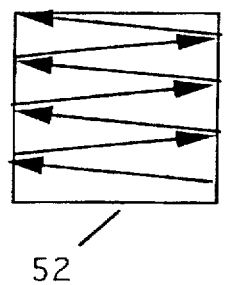

FIGS. 5A and 5B show two exemplary scan patterns which can be effected by the present invention to achieve a raster scan of an image or object. Both FIGS. 5A and 5B show a fast scan axis oriented horizontally along the x-axis and a slow scan oriented vertically along the y-axis. The present invention is capable of providing a forward or a backward scan pattern such as those shown in FIGS. 5A and 5B, respectively. FIG. 5A shows a forward scan pattern 51 with a horizontal fast axis and a vertical slow scan axis that is scanned from top to bottom. FIG. 5B shows a reverse scan pattern 52 with a horizontal fast scan axis and a vertical slow scan axis which is scanned from bottom to top. This orientation of fast and slow scan axes can be reversed so that the fast scan is oriented vertically along the y-axis and the slow scan is oriented horizontally along the x-axis. To display a 500×500 pixel image with a 30 Hz refresh rate, a fast axis sweep frequency of 500×30×2=30 KHz is required for projecting an image which is not written during the back sweep. Accordingly, the slow axis sweep frequency would be 30×2=60 Hz. For this, the light emitting sources 12–14 are modulated at 500×500×30×2=15 MHz, which is easily provided using well-known telecommunications technology for semiconductor light emitting sources. For example, see J. Wilson and J. F. B. Hawkes, Optoelectronics, Prentice Hall International, 1983, p. 410.

If desired, a frame buffer (not shown) may be included in memory 32 of controller 30 for allowing the writing of an image during a back sweep of the scan pattern. Additionally, standard techniques used with electron gun scanning displays, that is, CRTs, such as frame interleaving, may also be used with the present invention for allowing a slower scanning rate. It should be kept in mind that there is no inherent persistence in the display of the present invention, so the minimum frame write time must always be faster than the eye flicker rate of approximately 30 Hz. A phosphor view screen may be employed for endowing the display system with persistence.

Display brightness in projection applications depends on ambient lighting conditions and may range from 1 NIT (candela/m$^2$) in a very dark environment to 1000 NITs in a well-lit environment. Depending on a specific implementation of a HUD or a head mounted display, the display brightness requirements may correspond to the range of dark to light environments described above. The required display brightness range thus corresponds to a light power intensity of between 10 mW/m$^2$ and 10 W/m$^2$ at, for example, a 550 nm wavelength. This means that a HUD employing the present invention and projecting a 30 cm×30 cm virtual image area requires a light source which emits a light power between 1 mW and 1 W. If the light source of the present invention were chosen to be an LED, the external quantum efficiency would be 0.05% to 10% depending on the emitted color. If the light source were chosen to be a laser diode, the efficiency would be 50% or greater. Thus, the present invention allows for a highly efficient portable display system.

Figure 6:
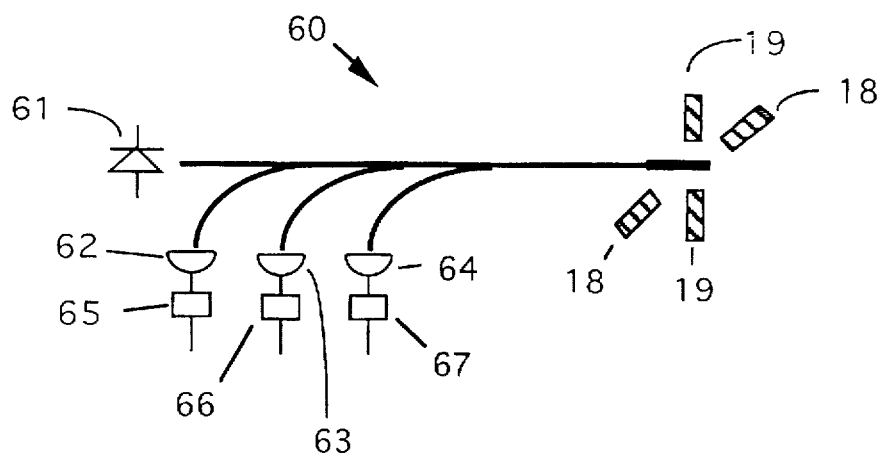
FIG. 6 is a partially perspective and partially schematic view of an embodiment of a fiber optic display system according to the present invention configured for displaying a first image while simultaneously scanning and acquiring a second image.

The display system 60 shown in FIG. 6 includes photodetectors 62–64, such as photodiodes, which are each sensitive to a different primary color for detecting radiation which is incident on the distal end 17 of optical fiber 11. By using wavelength selective filters (not shown), the particular frequencies of the light emitted by emitter 61 are removed from a received image so that photodetectors 62–64 are not sensitive to radiation emitted from emitter 61. Additionally or alternatively, a modulation technique can be used for source 61 so that an electronic notch or frequency domain filters 65–67 coupled to the respective outputs of detectors 62–64 removes the particular frequencies of the light emitted from emitter 61. In one configuration of this embodiment, image information is projected onto a semi-silvered reflective surface (FIG. 7), such as that which is used in a HUD application. Display system 60 simultaneously acquires a color image of a scene appearing beyond the semi-silvered reflective surface by detectors 62–64 detecting light signals impinging on distal end 17. In another configuration, a single monochrome detector can be used in place of color detectors 62–64.

Display system 60 can be configured with one or more of detectors 62–64 as a high gain detector, such as an avalanche photodiode or a photomultiplier tube, for providing a system with night vision capability. Such a real-time night vision feature can allow the system to scan an image and simultaneously project the scanned image onto a semi-silvered reflective surface of a HUD as the image is scanned.

Additionally, detectors 62–64 can be configured to detect primary colors so that a color image is projected. Further, a display system such as system 60 may include a controller which utilizes an algorithm which is suitable for enhancing directly viewed images for visually impaired individuals.

FIG. 7 shows a partially perspective, partially schematic view of an embodiment of a display system according to the present invention configured as a pair of spectacles or glasses used as a HUD. With this system, a virtual image may be displayed while a separate real image in front of a user may be detected by the system. Additionally or alternatively, a user's eye position can simultaneously be detected. In FIG. 7, display system 70 is mounted on a pair of spectacles 71. Another suitable configuration would be to mount display system 70 inside a helmet so that an image can be projected onto the inside surface of a visor. Still another configuration would be to mount system 70 inside a pair of goggles. Image 72 is projected onto a part of spectacles 74 which is either fully reflecting or partially reflecting, such as a semi-silvered reflective surface, as is known in the art of HUDs. Image 72, which appears to a viewer as a virtual image, is then viewed by eye 73. As described above in connection with FIG. 6, display system 70 may be used to capture a real image of a scene which lies outside of spectacles 71 and project the image onto the inside of the spectacles for providing enhanced vision or night vision. Alternatively, a phosphor view screen may be employed which is excited by the radiation emitted from the light source. Another alternative is that the view screen be a wavelength dependent reflector for reflecting radiation from the light source preferentially as compared to other wavelengths.

Eye tracking or gaze determination, or visual focus determination can also be achieved using system 70. Previously known techniques of eye tracking, such as that disclosed in U.S. Pat. No. 5,270,748 to Katz, which is incorporated herein by reference, emphasizes the importance of light detecting elements which are coincident with the source of the emitted light. This aspect of eye tracking is automatically assured by the present invention because the light source and detector are coupled to a single fiber. System 70 may be configured to simultaneously project an image 72 which is viewable by a user's eye 73, while the position of the user's eye is detected for analysis or for interactive purposes, such as an eye-cursor controlled heads up or head mounted display. Color filters and/or modulation techniques may be used for discriminating light reflected from the user's eye from other light detected by the system. Several techniques and applications for eye tracking are disclosed in U.S. Pat. No. 4,595,990 to Garwin et al., U.S. Pat. No. 5,220,361 to Lehmer et al., and an article by Glen A. Myers et al. entitled "Measuring eye movements using the shape of the pupil", Proceedings of the Annual Conference in Medicine and Biology (IEEE), Vol. 14, Pt. 4, pp. 1694–1695, 1991, all of which are incorporated herein by reference.

Figure 8:
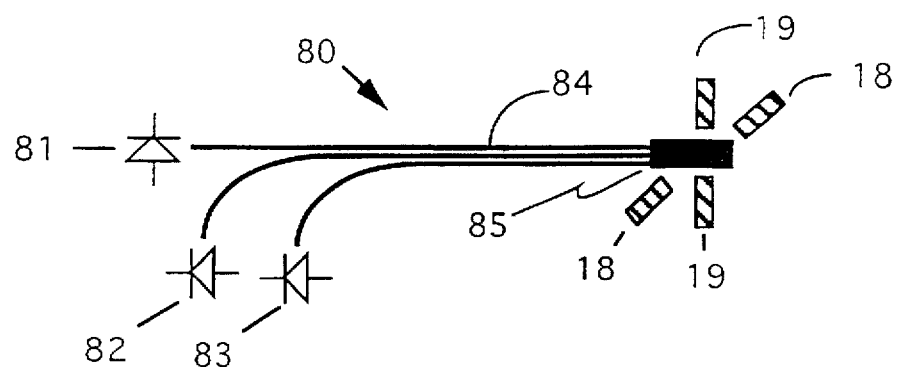
FIG. 8 is a partially perspective and partially schematic view of an embodiment of a fiber optic display system according to the present invention having a fiber bundle for projecting and detecting images.

In FIG. 8, the optical emitters 81 and detectors 82 and 83 of system 80, and those of the other embodiments described elsewhere in this disclosure, are not required to all be coupled to same optical fiber, but may be coupled to individual fibers of bundle 84. Fiber bundle 84, which forms a single pixel, is then deflected through a desired scan pattern as fiber unit 85. Emitter 81, which may be a plurality of emitters, and detectors 82 and 83 can be coupled to any convenient combination of the optical fibers forming bundle 84 for providing redundancy against failure.

FIG. 9 shows an embodiment of the present invention configured as an interactive display system 90. System 90 projects an image 93 onto screen 94 while a user interacts with system 90 by using a light emitting stylus or pointer 95, such as a diode laser pointer. Pointer 95 projects a localized spot of light 96 onto screen 94 which in turn is detected by detector 92 when distal end 17 of fiber 11 is pointing at spot 96. The wavelength or band of wavelengths emitted by pointer 95 is typically chosen to be different from the frequency or the band of frequencies emitted from source 91 so that spot 96 can be easily discriminated from an image projected by system 90. The position of spot 96 with respect to the projected image is readily determined based on the known pointing direction of distal end 17 and can thus be used to interactively control system 90. Alternatively, an electronic notch filter (not shown) can be used for allowing detector 92 to discriminate between radiation originating from pointer 95 and the radiation of source 91.

FIG. 10 shows a partially perspective, partially schematic view of a display system 100 according to the present invention configured as a computer display. System 100 projects an image onto screen 101 which may be attached to, or associated with computer 102. Screen 101 may be an accessory which is separate from computer 102 or may be any convenient existing surface, such as a wall. System 100 may also be used as a display for any other type of equipment in which it would be beneficial to have a compact and inexpensive display, such as an electronic pager or a wrist watch, for example.

The requirements of a high oscillation speed and a large amplitude of oscillation of the distal end of the fiber of the invention can be achieved by utilizing a resonant process. For example, the basic requirements of a fiber optic display and imager with a resolution of 500×500 pixels, 5 micron core diameter fiber and 30 Hz screen write time is an oscillation period of 500×30×2=30 KHz along the fast scan axis, an oscillation period of 30 Hz along the slow scan axis, and with a displacement of 500×5 microns=2.5 mm along both the fast scan and slow scan axes. These requirements may be relaxed if, for example, less resolution is required or if the image is displayed or scanned during a backsweep of the fiber. Briefly considering the general concept of a resonant process, the Q of a material refers to the time for an oscillating structure to undergo a 1/e decrease in its oscillation amplitude divided by the oscillation period, where e equals 2.71828 .... Thus, the Q is a measure of the inherent loss of the oscillating structure. A perfectly lossless structure (infinite Q) would, once started, continue to oscillate indefinitely. A high Q structure therefore has low loss, whereas low Q has high loss.

Resonant processes allow a small amplitude oscillation to drive a resonant structure so that the resonant structure, after some build up time, undergoes large amplitude oscillations. This concept is familiar in the case of pushing a swing. Briefly, the extent of arm motion of a person pushing the swing is small, but after several pushes, if the swing is driven resonantly, the swing oscillation reaches a large amplitude. Such a resonant process is possible only because the decay time of the swing oscillation amplitude due to loss is much longer than the build up time required to reach a large oscillation. In this example, the Q of the swing is large.

Parametric processes allow a pumping force at a frequency $w_s$ to amplify an oscillation at a frequency $w_0$, where $w_s = k * w_0$ and where k is an integer which is greater than or equal to 2. This is familiar in the case of a swing where a swinger applies the pumping force to the swing by pumping, or swinging, the swinger's legs. That is, the swinger's legs are pumped at a frequency which is twice the frequency of the swing's oscillation. This same concept can be applied to the present invention for driving the distal end of the optical fiber in a predetermined scanning pattern.

The oscillating fiber display of the present invention, in one sense, consists of an oscillating element (which may be the optical fiber itself or the optical fiber connected to a further resonant structure), and a drive element for driving the oscillating element. When the drive element is directly connected to the oscillating element, it may be desirable to have a drive element which may both be driven in response to an electrical signal and which has high Q (low loss). Certain crystals such as GaAs, Si and quartz have a very high Q and, in addition, are well-known in the field of piezoelectricity. However, such crystals may have only a very small amplitude oscillation. Consequently, if these crystals are used to drive the present invention, they may be used in a resonant configuration for causing a large amplitude oscillation in the oscillating structure.

In the situation where the drive element used in the present invention has a low Q (high loss), it may be desirable to decouple the drive element from the oscillating element, that is, so that the drive element is not in continuous contact with the oscillating element so that the drive element drives the oscillating element intermittently in a periodic manner. Thus, the drive element does not impart a loss to the oscillating element because the drive element is in contact with the oscillating element for only a short period of time. Such an arrangement is possible in a configuration of a impact actuator in which a piezoelectric or other similar transducer induces a stress wave causing a hammer to strike the oscillating element, setting the oscillating element into motion. Impact actuators of this type are used in dot matrix printers.

Figure 11:
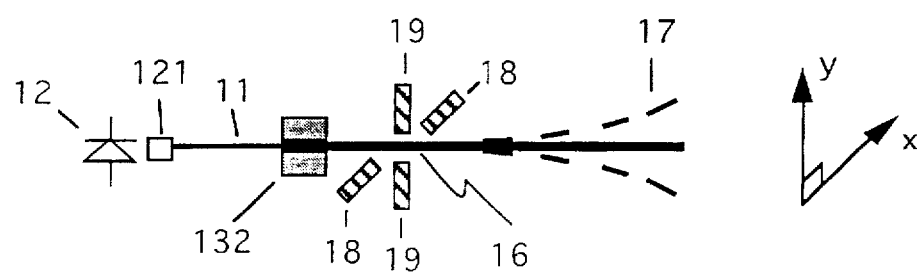
FIG. 11 is a partially perspective and partially schematic view of an embodiment of the scanned optical fiber system according to the invention which is resonantly driven by a non-connected driving element.

FIG. 11 shows a partially perspective and partially schematic view of one of the previously described embodiments of the invention which is resonantly driven by a non-connected driving element. Fiber 11 is encased in a sheath 16 which extends from distal end 17 to a point of anchor 132. In one configuration of the invention using a non-connected driving element, sheath 16 is magnetic and actuators 18 and 19 produce magnetic impulses along the X and Y axes which are applied resonantly to the oscillating element for causing a large amplitude oscillation in two dimensions at distal end 17 in the manner of resonant processes. Alternatively, sheath 16 may be susceptible to an applied electric field and actuators 18 and 19 may be plates which induce an electric field for causing the oscillating element to oscillate. In order that the system is driven resonantly, a device for properly timing drive pulses may be required. The previously described feedback techniques may be used for providing, for example, proper timing and drive amplitude control.

Figure 12:
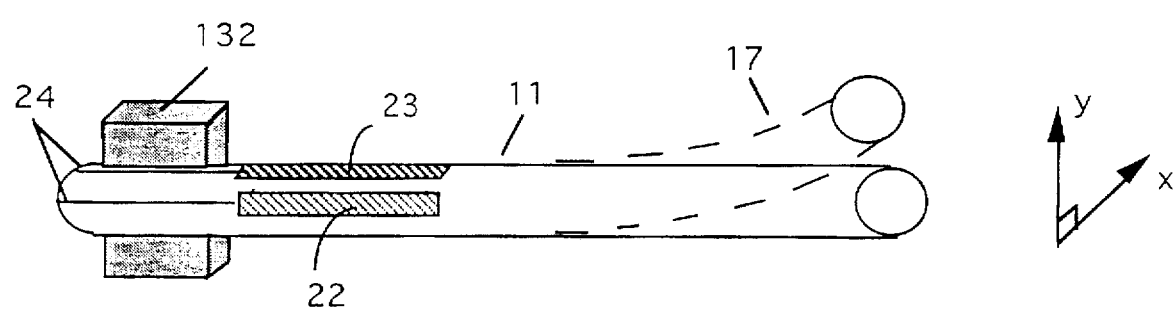
FIG. 12 is a partially perspective and partially schematic view of an embodiment of the scanned optical fiber system according to the invention which is resonantly driven by a connected driving element.

FIG. 12 shows a partially perspective and partially schematic view of another of the previously described embodiments of the invention which is resonantly driven by a driving element which is in continuous contact with the distal end of the fiber. In one configuration of the invention using a connected driving element, x- and y-axis piezoelectric drive elements 22 and 23, respectively, are connected to fiber 11. Fiber 11 is anchored to anchor point 132. Small oscillations of the drive elements in response to electrical signals applied to electrodes 24 cause large amplitude oscillations of distal end 17 of fiber 11 in the manner of a resonant process.

Figure 13:
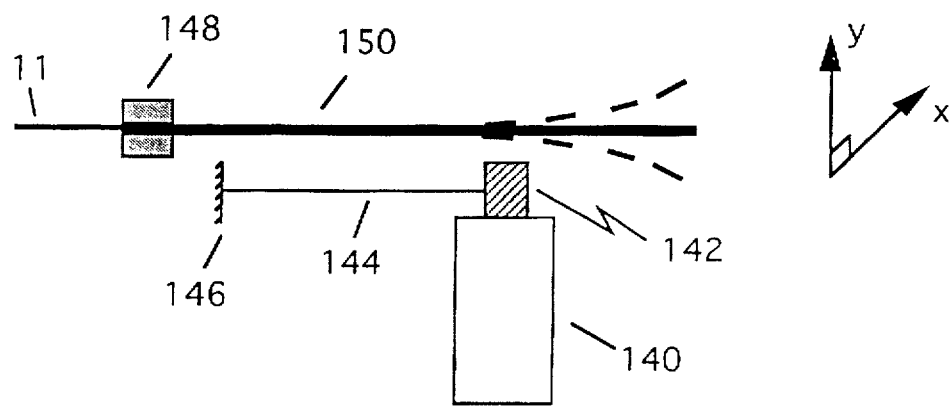
FIG. 13 is a partially perspective and partially schematic view of an embodiment of the scanned optical fiber system according to the invention driven with an impact actuator in which the fiber structure is not in continuous contact with the impact hammer structure.

FIG. 13 shows a partially perspective and partially schematic view of an embodiment of the invention driven by an impact actuator in which the fiber structure is not attached to an impact hammer structure of the impact actuator. Fiber 11 is embodied in a resonant structure 150 which is anchored to anchor point 148. Alternatively, fiber 11 alone may serve as the resonant structure of the system. Upon being electrically excited, a piezoelectric structure 140 induces a stress wave to propagate to hammer element 142. Hammer element 142 then separates from piezoelectric structure 140 and impacts resonant structure 150 causing the resonant structure to oscillate. Spring 144 anchored to spring anchor point 146 causes hammer element 142 to return to its initial position. While FIG. 13 shows only a y-axis impact actuator for clarity, an additional x-axis impact actuator (not shown) formed from a second set of elements 140, 142, 144 and 146 is mounted perpendicular to the y-axis impact actuator so that resonant structure 150 oscillates simultaneously in two dimensions, that is, along the x- and y-axes. A waveguide structure (not shown) may be interposed between piezoelectric element 140 and hammer element 142 as is known in the art.

Figure 14:
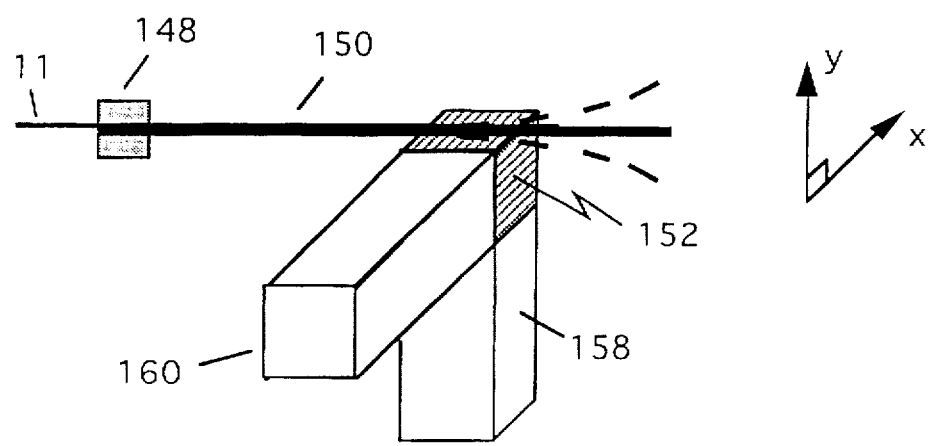
FIG. 14 is a partially perspective and partially schematic view of an embodiment of the scanned optical fiber system according to the invention driven with an impact actuator in which the fiber structure is in continuous contact with the impact hammer structure.

FIG. 14 shows a partially perspective and partially schematic view of another embodiment of the invention driven with an impact actuator in which the fiber structure is attached to the impact hammer structure. This embodiment is similar to the embodiment of FIG. 13, except resonant structure 150 of this embodiment is connected to a single hammer element which is driven by x- and y-axes piezoelectric elements 158 and 160, respectively. In this embodiment, both piezoelectric elements operate as delineated above, or one element, for example, the slow axis element, may operate as a standard piezoelectric element causing the hammer element to be translated by an amount which is proportional to an applied electrical signal.

A parametric driver may also be used for driving the oscillating structure of the invention. Strictly speaking, a parametric driver is configured as an amplifier so that if the oscillating structure is at rest, it will stay at rest. A starting mechanism may be used to give the oscillating structure a small initial displacement which is amplified by the parametric driver. Alternatively, the oscillating structure may begin oscillation from noise or the oscillating structure may be slightly off center with respect to the parametric force of the parametric driver.

A parametric driver may be configured to drive the oscillating structure of the invention in two directions simultaneously at two separate oscillation frequencies by driving the parametric driver with a doubly-modulated signal such that the doubly-modulated signal is a multiple of the x-axis resonant frequency and a multiple of the y-axis resonant frequency. Alternatively, separate parametric drivers, either serially (FIG. 15) or concentrically (FIG. 16) situated or arranged, each operating at a frequency which is a multiple of the x- and y-axes resonant frequencies, respectively.

Figure 15:
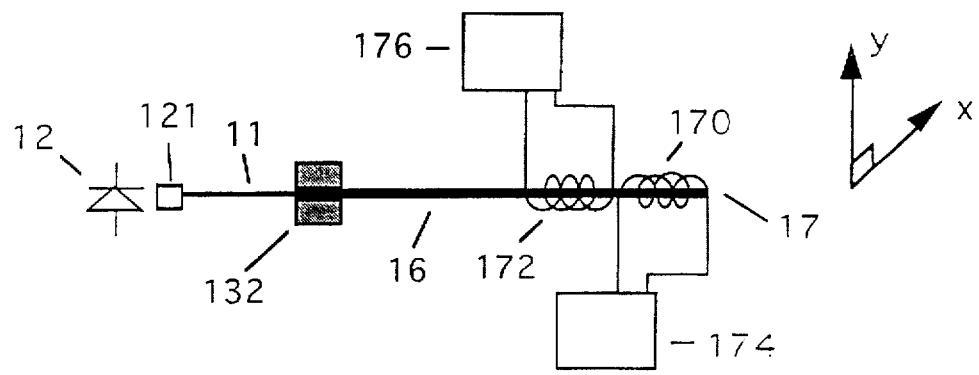
FIG. 15 is a partially perspective and partially schematic view of an embodiment of the scanned optical fiber system according to the invention which is parametrically driven.

FIG. 15 shows a partially perspective and partially schematic view of an embodiment of the oscillating fiber system of the invention which is parametrically driven. Optical fiber 11, which is clamped at clamp point 132, is encased in a sheath 16 which is susceptible to a magnetic field. Sheath 16 may, in addition, be a resonant structure with its own resonant characteristics. Alternatively, sheath 16 may be a coating which covers fiber 11. Electromagnet coils 170 and 172 are driven at frequencies $k*w_x$ and $l*w_y$ in response to impulses from controllers 174 and 176, respectively, where $w_x$ and $w_y$ are the resonant frequencies of the fiber structure along the x- and y-axes, respectively, and k and l are integers. The action of the impulses exerts a force on the fiber structure towards the center of the electromagnetic coil, as is known in the art of electromagnetics. The impulses are sufficient to maintain oscillation of the fiber structure simultaneously along the x- and y-axes at frequencies $w_x$ and $w_y$, respectively, as is known in the theory of parametric processes. Alternatively, electromagnetic coils 170 and 172 may be concentrically situated, or arranged, as shown in FIG. 16.

Figure 17:
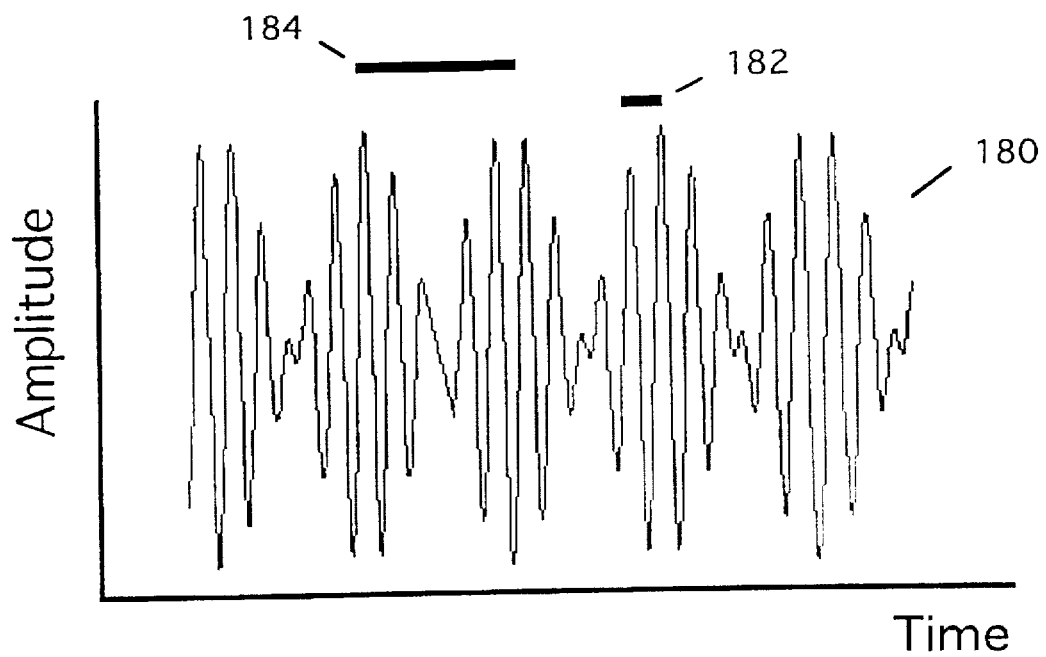
FIG. 17 is a plot of an exemplary doubly-modulated waveform used to drive a parametric driver according to the invention.
Figure 18:
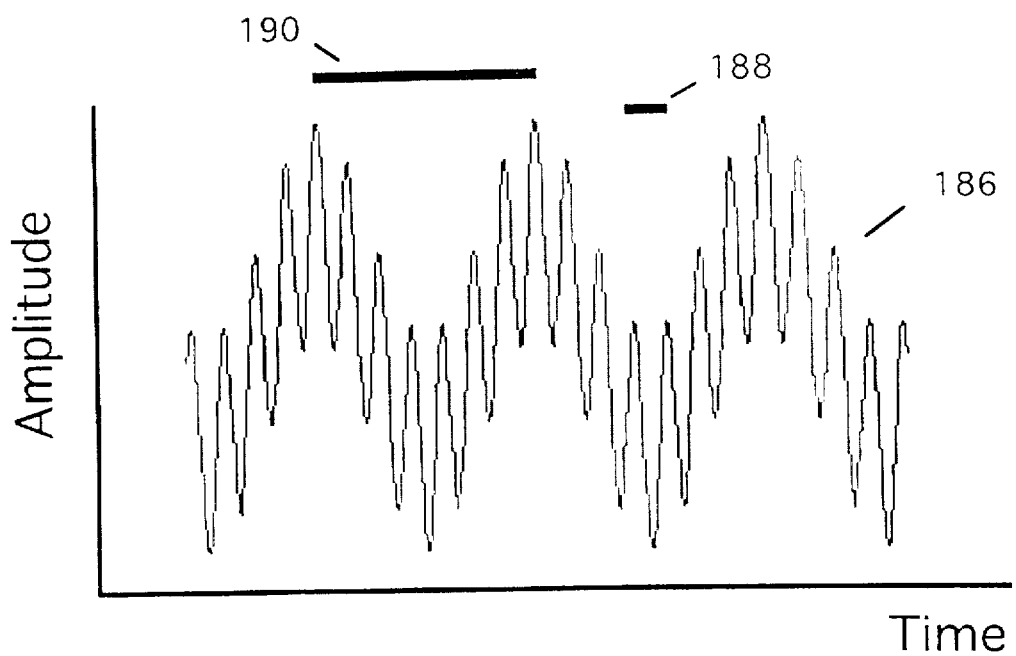
FIG. 18 is a plot of another exemplary doubly-modulated waveform used to drive a parametric driver according to the invention.

A further alternative is to eliminate electromagnetic coil 172 and controller 176, and to drive coil 170 with a doubly-modulated waveform from controller 174. FIGS. 17 and 18 show exemplary doubly-modulated waveforms 180 and 186, respectively. In FIGS. 17 and 18, time durations 182 and 188 are equal to $1/(k*w_x)$ and time durations 184 and 190 are equal to $1/(l*w_y)$. Waveform 180 in FIG. 17 corresponds to the product of two single frequency waveforms, while waveform 186 in FIG. 18 corresponds to the sum of two single frequency waveforms.

Figure 16:
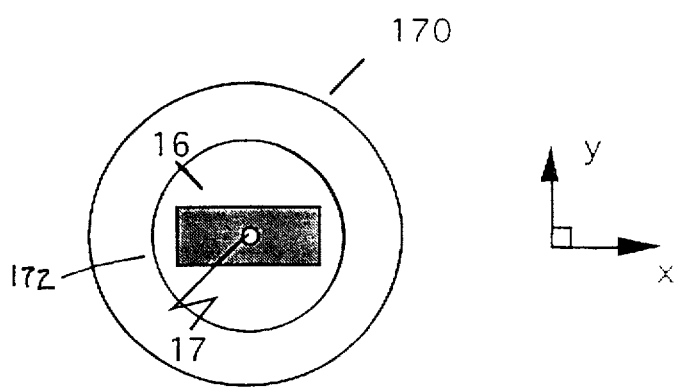
FIG. 16 is an end view of the fiber optic-resonant structure assembly according to the invention enclosed in a electromagnetic coil.

FIG. 16 shows an end view of the fiber optic-resonant structure assembly enclosed in electromagnetic coils 170 and 172. Optical fiber 11 is enclosed in a sheath 16 which is susceptible to a magnetic field. Sheath 16 also includes a resonant structure which may have a resonant frequency $w_x$ along the x-axis and a resonant frequency $w_y$ along the y-axis. The ensheathed optical fiber resonant structure is further encircled by electromagnetic field coils 170 and 172. It should be understood that in all of the foregoing descriptions, the function of the magnetically susceptible sheath 16 and the electromagnetic coils 170 and 172 may be interchangeable such that the sheath can be electromagnetic and elements 170 and 172 are magnetically susceptible.

Figure 19:
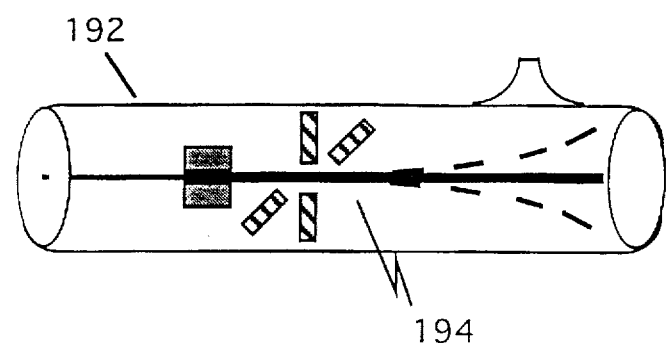
FIG. 19 is a partially perspective and partially schematic view of an embodiment of the scanned optical fiber system according to the invention which is encased in an evacuated envelope.

Regarding all previously described embodiments, the oscillating fiber assembly may be enclosed in an evacuated envelope or chamber for preventing damping of the assembly and for preventing the assembly from producing an audible sound. FIG. 19 shows an oscillating fiber assembly 194 encased in an exemplary evacuated envelope 192.

Other embodiments are within the scope of the following claims.

What is claimed is:

1. A display system comprising:
   a light source for producing a modulated light;
   an optical fiber having a first end and a second end, the first end of the optical fiber being coupled to the light source; and
   a deflection device coupled to the second end of the optical fiber, the deflection device deflecting the second end of the optical fiber in a two-dimensional scanning pattern for projecting an image onto a viewing surface from the second end of the optical fiber, the projected image being related to the modulated light.

2. The display system according to claim 1, further comprising a detector coupled to the first end of the optical fiber for detecting light received by the second end of the optical fiber.

3. The display system according to claim 2, wherein the detected light is coupled to the light source for projecting an image from the second end of the optical fiber related to the light detected by the detector.

4. The display system according to claim 3, wherein the detector is exclusively sensitive to ambient light and insensitive to light from the light source.

5. The display system according to claim 3, further comprising a controller disposed between the detector output and the light source for performing an image enhancement algorithm.

6. The display system according to claim 2, further comprising a light stylus for projecting a pointer light onto the viewing surface, and wherein the detector detects the pointing light received through the second end of the optical fiber.

7. The display system according to claim 6, wherein the pointer light is modulated and the detector detects the modulated pointer light received through the second end of the optical fiber, and the display system further comprises a filter coupled to an output of the detector for discriminating the detected modulated pointer light.

8. The display system according to claim 2, further comprising a wavelength selective filter disposed between the detector and the first end of the optical fiber.

9. The display system according to claim 2, further comprising an electronic notch filter or electronic frequency domain filter at the output of the detector.

10. The display system according to claim 2, wherein the detector is a photodiode.

11. The display system according to claim 2, wherein the detector is a high sensitivity photodetector selected from the group consisting of a photomultiplier tube or an avalanche photodiode.

12. The display system according to claim 2, wherein the detector is a plurality of detectors.

13. The display system according to claim 12, wherein the detectors are chromatic detectors.

14. The display system according to claim 2, further comprising a second light source, coupled to the first end of the optical fiber, for producing a second light which is projected from the second end of the optical fiber for illuminating a user's eye, wherein the detector detects the second light illuminating the user's eye for determining a direction of the user's gaze.

15. The display system according to claim 1, wherein the deflection device is a parametric driver.

16. The display system according to claim 15, wherein the parametric driver includes at least one electromagnetic coil.

17. The display system according to claim 16, wherein the parametric driver includes two electromagnetic coils which are arranged serially.

18. The display system according to claim 16, wherein the parametric driver includes two electromagnetic coils which are arranged concentrically.

19. The display system according to claim 16, wherein at least one electromagnetic coil is driven by a doubly-modulated waveform.

20. The display system according to claim 1, further comprising a frame on which the optical fiber and the viewing surface are mounted, the frame being adapted to be worn by a user.

21. The display system according to claim 20, wherein the viewing surface is a phosphor surface which is excited by light produced by the light source.

22. The display system according to claim 21, wherein the light source is a plurality of light sources, and the phosphor is a plurality of phosphors each sensitive to a different wavelength of light produced by the plurality of light sources.

23. The display system according to claim 20, wherein the viewing surface is a wavelength dependent reflective surface differentially reflecting light having a wavelength produced by the light source with respect to light having a wavelength different from the wavelength produced by the light source.

24. The display system according to claim 1, further comprising an imaging optical device at the second end of the optical fiber for adjusting the projected image so that the projected image can be viewed.

25. The display system according to claim 24, wherein the imaging optical device is selected from the group consisting of a dispersive optical device, a reflective optical device, a Fresnel optical device a graded refractive index optical device and a binary optic type optical device.

26. The display system according to claim 24, wherein the imaging optical device is attached to the second end of the optical fiber.

27. The display system according to claim 1, further comprising a feedback device for detecting a position of the second end of the optical fiber and providing an indication of the detected position of the second end of the optical fiber.

28. The display system according to claim 27, wherein the feedback device is selected from the group consisting of a hall effect detector, an optical proximity detector, a strain gauge, a piezoelectric force sensing element, and a magnetic impedance detector.

29. The display system according to claim 27, wherein the feedback device comprises:
- a second light source coupled to the first end of the optical fiber, the second light source emitting a second light which is projected from the second end of the optical fiber;
- a reflective array disposed at the second end of the optical fiber for reflecting the second light projected from the second end of the optical fiber back to the second end of the optical fiber; and
- a detector, coupled to the first end of the optical fiber for detecting the second light which is reflected by the reflective array and received by the second end of the optical fiber, for producing the indication of the detected position of the second end of the optical fiber.

30. The display system according to claim 1, wherein the light source is a plurality of light sources coupled to the optical fiber.

31. The display system according to claim 30, wherein the plurality of light sources are chromatic light sources.

32. The display system according to claim 1, further comprising a mechanically resonant device on the second end of the optical fiber, wherein mechanically resonant device and the optical fiber together have a first resonant frequency along a first dimension of the two-dimensional scanning pattern and a second resonant frequency along a second dimension of the two-dimensional scanning pattern.

33. The display system according to claim 32, wherein the first resonant frequency is different from the second resonant frequency.

34. The display system according to claim 1, wherein the deflection device comprises a plurality of piezoelectric transducer elements formed on to the second end of the optical fiber, wherein the piezoelectric transducer elements are responsive to deflection drive signals for deflecting the second end of the optical fiber in the two-dimensional scanning pattern.

35. The display system according to claim 34, wherein the piezoelectric transducer elements are formed from a PVDF material in either bimorph or multimorph configuration.

36. The display system according to claim 1, further comprising a controller, coupled to the deflection device and the light source, for modulating the light synchronously with the deflection of the second end of the optical fiber.

37. The display system according to claim 36, wherein the controller having an algorithm containing nonlinearity characteristics associated with the two-dimensional scanning pattern for proper synchronization of the light source.

38. The display system according to claim 1, further comprising a detector coupled to the light source for regulating an intensity or a modulation of the light source.

39. The display system according to claim 38, wherein the detector is a photodetector.

40. The display system according to claim 1, wherein the light source is selected from the group consisting of a laser diode, a light emitting diode and a conductive plastic light emitting element.

41. The display system according to claim 1, further comprising a Faraday type isolator or waveplate polarizer type isolator between the light source and the first end of the optical fiber.

42. The display system according to claim 1, wherein the deflection device comprises:
- a magnetic material formed on the second end of the optical fiber; and
- a plurality of electromagnets arranged at the end of the optical fiber for producing a variable magnetic field which couples the magnetic material,
- wherein the variable magnetic field of the electromagnets interacts with the magnetic material for deflecting the second end of the optical fiber in the two-dimensional scanning pattern.

43. The display system according to claim 1, wherein the viewing surface is associated with a computer.

44. The display system according to claim 1, wherein the viewing surface is associated with a pager.

45. The display system according to claim 1, wherein the deflection device includes a piezoelectric material having high intrinsic Q, and the piezoelectric material is responsive to deflection drive signals for deflecting the second end of the optical fiber in the two-dimensional scanning pattern.

46. The display system according to claim 1, wherein the second end of the optical fiber is resonantly driven by the deflection device, and the deflection device is not in continuous contact with the second end of the optical fiber.

47. The display system according to claim 1, wherein the second end of the optical fiber is driven resonantly by the deflection device, and the deflection device is in continuous contact with the second end of the optical fiber.

48. The display system according to claim 1, wherein the Q of the deflection device is decoupled from the Q of the second end of the optical fiber.

49. The display system according to claim 1, wherein the deflection device includes an impact actuator having a hammer element for deflecting the second end of the optical fiber, and a resonant structure of the second end of the optical fiber is not in continuous contact with the hammer element of the impact actuator.

50. The display system according to claim 1, wherein the deflection device includes an impact actuator having a hammer element for deflecting the second end of the optical fiber, and a resonant structure of the second end of the optical fiber is in continuous contact with the hammer element of the impact actuator.

51. The display system according to claim 1, wherein the deflection device comprises:
- a first electromagnet coupled to the second end of the optical fiber for generating a first magnetic field; and
- second and third electromagnets arranged at the second end of the optical fiber for producing second and third variable magnetic fields, respectively, the second and third variable magnetic fields coupling the first magnetic field,
- wherein the second and third variable magnetic fields interact with the first magnetic field for deflecting the second end of the optical fiber in the two-dimensional scanning pattern.

52. The display system according to claim 1, wherein the deflection device comprises a plurality of magnetostrictive transducer elements formed on the second end of the optical fiber, and an external first and second magnetic field, wherein the magnetostrictive transducer elements are responsive to the first and second magnetic fields for deflecting the second end of the optical fiber in the two-dimensional scanning pattern.

53. The display system according to claim 1, wherein the deflection device comprises a first electrostatic device coupled to the second end of the optical fiber; and a second electrostatic device arranged at the second end of the optical fiber, wherein the first and second electrostatic devices interact for deflecting the second end of the optical fiber in the two-dimensional scanning pattern.

54. The display system according to claim 1, wherein the optical fiber is a plurality of optical fibers formed into a bundle of optical fibers, the bundle of optical fiber having a first end and a second end, the second end forming a single pixel;

wherein the light source is a plurality of light sources, each light source being coupled to a respective optical fiber of the plurality of optical fibers at the first end of the bundle of optical fibers; and wherein the deflection device is coupled to the second end of the bundle of optical fibers, the deflection device deflecting the second end of the bundle of optical fibers in the predetermined scanning pattern for projecting the image onto the viewing surface from the second end of the bundle of optical fibers.

55. The display system according to claim 1, wherein the viewing screen is one of the group consisting of a user's eye, a cornea and a retina.

56. The display system of claim 1, wherein at least the optical fiber is enclosed in an evacuated envelope.

* * * * *